(12) United States Patent
Spiesberger

(10) Patent No.: US 8,297,210 B2
(45) Date of Patent: Oct. 30, 2012

(54) INDIVIDUAL-GRAIN SEEDING MACHINE

(75) Inventor: Franz Spiesberger, Lohnsburg (AT)

(73) Assignee: Wintersteiger AG, Ried im Innkreis (AT)

( * ) Notice: Subject to any disclaimer, the term of this patent is extended or adjusted under 35 U.S.C. 154(b) by 0 days.

(21) Appl. No.: 12/998,323

(22) PCT Filed: Nov. 26, 2009

(86) PCT No.: PCT/AT2009/000462
§ 371 (c)(1),
(2), (4) Date: Apr. 8, 2011

(87) PCT Pub. No.: WO2010/063047
PCT Pub. Date: Jun. 10, 2010

(65) Prior Publication Data
US 2011/0253019 A1 Oct. 20, 2011

(30) Foreign Application Priority Data

Dec. 5, 2008 (AT) .................... A 1898/2008

(51) Int. Cl.
*A01C 7/10* (2006.01)
(52) U.S. Cl. ...................................................... 111/185
(58) Field of Classification Search ............ 111/184, 111/185, 177, 170
See application file for complete search history.

(56) References Cited

U.S. PATENT DOCUMENTS

| 4,449,642 | A | 5/1984 | Dooley |
| 4,718,574 | A | 1/1988 | Schoenmaekers |
| 6,435,114 | B1 | 8/2002 | Spiesberger |
| 7,111,567 | B2 | 9/2006 | Carr et al. |
| 2006/0037520 | A1 | 2/2006 | Tsing |

FOREIGN PATENT DOCUMENTS

| FR | 2 323 308 | 4/1977 |
| SU | 180 65 12 | 4/1993 |
| WO | WO 01/41553 | 6/2001 |

OTHER PUBLICATIONS

International Search Report.

*Primary Examiner* — Christopher J. Novosad
(74) *Attorney, Agent, or Firm* — Collard & Roe, P.C.

(57) ABSTRACT

A single-grain sowing machine having a sowing disc (3) forming a front wall of a seed hopper (2) is described, which comprises a fixed disc body (4) suctioned on the side facing away from the seed hopper (2) having at least one guide slot (5), and a conveyor disc (6), pressing against the disc body (4) on the side of the seed hopper (2) and drivable around a horizontal axis, having driver slots (7) distributed around the circumference and extending over the radial extension area of the guide slot (5), which form intake openings (8) for the seed grains dispensable from the seed hopper (2) along the guide slot (5) in the overlap area with the guide slot (5). In order to be able to perform simple residual emptying of the seed hopper (2), it is proposed that the seed hopper (2) have a floor in the form of an emptying flap (17), which is pivotable coaxially to the sowing disc (3) between a closed position and an open position.

3 Claims, 4 Drawing Sheets

INDIVIDUAL-GRAIN SEEDING MACHINE

CROSS REFERENCE TO RELATED APPLICATIONS

This application is the National Stage of PCT/AT2009/000462 filed on Nov. 26, 2009, which claims priority under 35 U.S.C. §119 of Austrian Application No. 1898/2008 filed on Dec. 5, 2008, the disclosure of which is incorporated by reference. The international application under PCT article 21(2) was not published in English.

FIELD OF THE INVENTION

The invention relates to a single-grain sowing machine having a sowing disc forming a front wall of a seed hopper, which comprises a fixed disc body suctioned on the side facing away from the seed hopper having at least one guide slot, and a conveyor disc, which is drivable around a horizontal axis and presses against the disc body on the side of the seed hopper, having driver slots distributed around the circumference and extending over the radial extension area of the guide slot, which forms intake openings for the seed grains, which are dispensable along the guide slot from the seed hopper, in the overlap area with the guide slot.

DESCRIPTION OF THE PRIOR ART

In order to achieve reliable isolation of seed grains and uniform dispensing of the isolated seed grains, dividing the sowing disc into a fixed disc body and a conveyor disc pressing against this disc body, which is provided with radial driver slots, is known in single-grain sowing machines (WO 2001/041553 A1). Because the disc body is provided with a guide slot, which extends over a peripheral area and forms a dispensing path for the seed grains, which is suctioned on the side facing away from the conveyor disc, intake openings for the seed grains result in the overlap area of the driver slots with the guide slot, the seed grains being dispensed along the guide slot from the seed hopper connected to the sowing disc. The seed grains suctioned on the intake openings come into contact with both the fixed disc body and also with the rotating conveyor disc, which results in rotation of the suctioned seed grains with the effect that a seed grain suctioned on an intake opening covers the intake opening with displacement of the remaining seed grains, while the remaining seed grains fall back into the seed hopper. However, it is disadvantageous that the seed hopper can only be emptied via the sowing disc, if the seed grains are no longer needed at the end of a parcel of land, for example.

In single-grain sowing machines having a suctioned sowing disc for dispensing isolated seed grains from a seed hopper, pivoting the seed hopper around an eccentric axis relative to the sowing disc axis is known (U.S. Pat. No. 7,111,567 B2), so that the peripheral dispensing opening of the seed hopper, which is directed upward for the single-grain dispensing with the aid of the sowing disc, points downward after being pivoted with the effect that the remaining seed grains fall out of the seed hopper and the seed hopper is emptied. This seed hopper, which is pivotable around an eccentric axis, not only causes significant construction effort, but rather also requires sowing discs whose intake holes for the seed grains are situated along a pitch circle concentric to the sowing disc.

SUMMARY OF THE INVENTION

The invention is thus based on the object of implementing a single-grain sowing machine of the type described at the beginning using comparatively simple construction means so that an advantageous residual emptying of the seed hopper is made possible without obstructing the single-grain dispensing along the guide slot.

The invention achieves the stated object in that the seed hopper has a floor in the form of an emptying flap, which is pivotable coaxially to the sowing disc between a closed position and an open position.

Because the seed hopper is provided with a floor-side emptying flap, simple construction conditions result, because the emptying flap is mounted coaxially to the sowing disc and can be displaced between the closed position and the open position by rotation around the sowing disc axis, without endangering the seed dispensing from the seed hopper along the guide slot, which is to run close to the sowing disc axis in the intake area of the seed grains from the seed hopper, in order to support reliable suctioning of the individual seed grains at the intake openings of the sowing disc because of a low relative velocity between sowing disc and seeds. The emptying flap rotating into the open position can additionally form an advantageous guide for the residual grains to be dispensed from the seed hopper because of its inclination, which is of interest in particular for gravity-supported emptying.

In order to prevent seeds from being poured into the seed hopper when the emptying flap is open, the emptying flap can be connected to drive a closure for a filling opening in the front wall of the seed hopper opposite to the sowing disc, the closure exposing the filling opening in the closed position of the emptying flap, but closing it in the open position of the emptying flap.

In order that the seed grains suctioned on the sowing disc in the area of the seed hopper are also dispensed from the seed hopper upon opening of the emptying flap, the emptying flap can be connected to drive a stripper for seed grains suctioned on the sowing disc. The drive connection between the emptying flap, on the one hand, and the closure for the filling opening and the stripper, on the other hand, can be ensured in a simple way in that the emptying flap comprises a molded body, which forms the closure and the stripper. However, such an embodiment is not compulsory.

BRIEF DESCRIPTION OF THE DRAWING

The subject matter of the invention is shown for exemplary purposes in the drawing. In the figures.

DESCRIPTION OF THE PREFERRED EMBODIMENT

Figure 1:
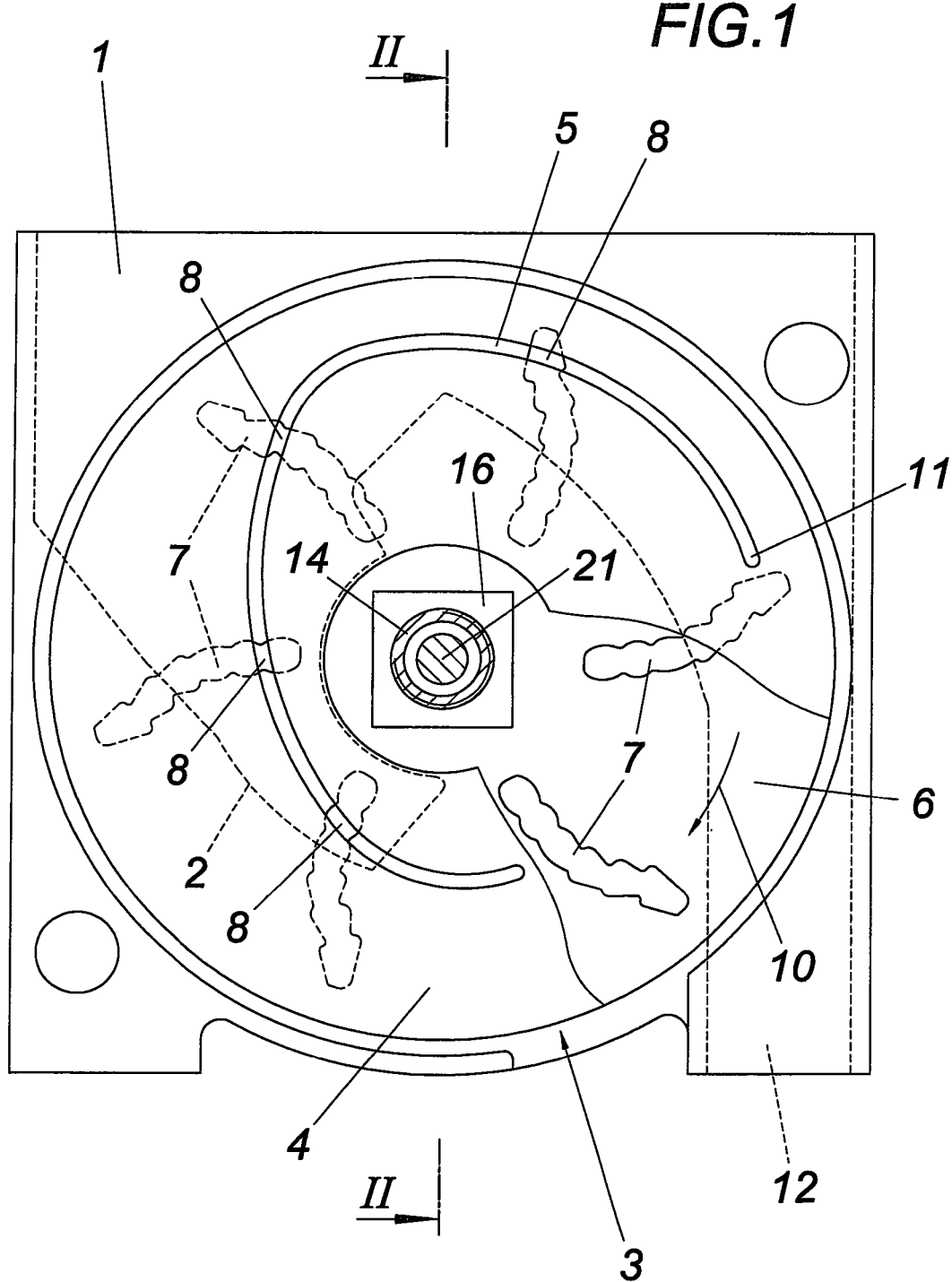
FIG. 1 shows a single-grain sowing machine according to the invention partially in the area of the sowing disc in a schematic view in the direction of the sowing disc axis.

The illustrated single-grain sowing machine has a housing 1 in the sowing disc area, which forms a seed hopper 2, and is covered frontally by a sowing disc 3. This sowing disc 3 is composed of a housing-fixed disc body 4 having a guide slot 5 and a conveyor disc 6, which is provided with driver slots 7, which extend over the radial extension area of the guide slot 5 and run essentially radially. Intake openings 8 for seed grains poured into the seed hopper 2 thus result in the overlap area between the guide slot 5 and the driver slots 7. To suction the seed grains at the intake openings 8, a partial vacuum chamber 9 is provided on the side of the sowing disc 3 facing away from the seed hopper 2, as can be inferred from FIG. 2. The seed grains are suctioned on the intake openings 8 in the floor area of the seed hopper 2 while isolating the seed grains when the driver slots 7 reach the area of the seed hopper 2 during the rotation of the conveyor disc 6 in the conveyor direction 10. The suctioned, isolated seed grains are then conveyed along the guide slot 5 out of the seed hopper 2 and fall off of the conveyor disc 6 into a dispensing shaft 12 at the dispensing-side end 11 of the guide slot 5.

A hollow shaft 14, which is driven via a chain wheel 15, and is mounted in the housing cover 13 forming the partial vacuum chamber 9, is used to drive the conveyor disc 6. The rotational drive of the conveyor disc 6 is ensured by a rectangular nut 16, which engages in a corresponding rectangular opening of the conveyor disc 6, as can be inferred from FIG. 1 in particular.

Figure 2:
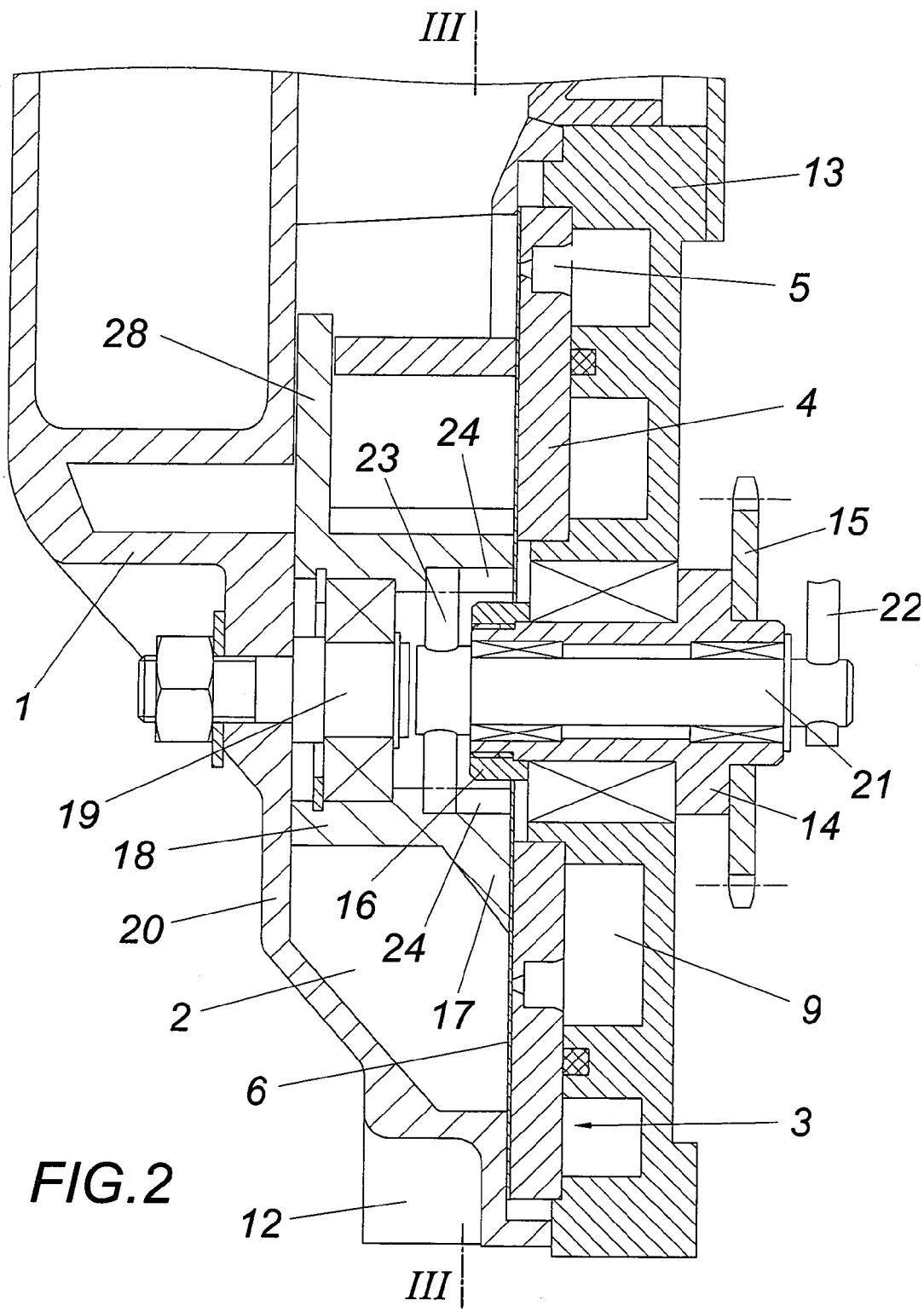
FIG. 2 shows a simplified section along line II-II of FIG. 1 in an enlarged scale.

In order to be able to empty the seed hopper 2 completely at the end of a parcel of land, for example, the floor of the seed hopper 2 has an emptying flap 17 pivotable coaxially to the sowing disc 3. This emptying flap 17 is carried by a sleeve 18, which is mounted so it is rotatable on an axis 19 coaxial to the hollow shaft 14. This axis 19 is fastened in the front wall 20 of the housing 1 opposite to the sowing disc 3, as shown in FIG. 2. For the pivot displacement of the emptying flap 17 between a closed position shown in FIG. 3 and an open position shown in FIG. 4, a pivot shaft 21 is provided, which is mounted so it is rotatable in the hollow shaft 14 and can be actuated with the aid of a pivot cylinder via a pivot arm 22, for example. The end of the pivot shaft 21 protruding out of the hollow shaft 14 carries a driver bolt 23, which engages in driver openings 24 of the sleeve 18. By actuating the pivot shaft 21, the emptying flap 17 can thus be pivoted into the open position according to FIG. 4 to empty the seed hopper 2.

Figure 3:
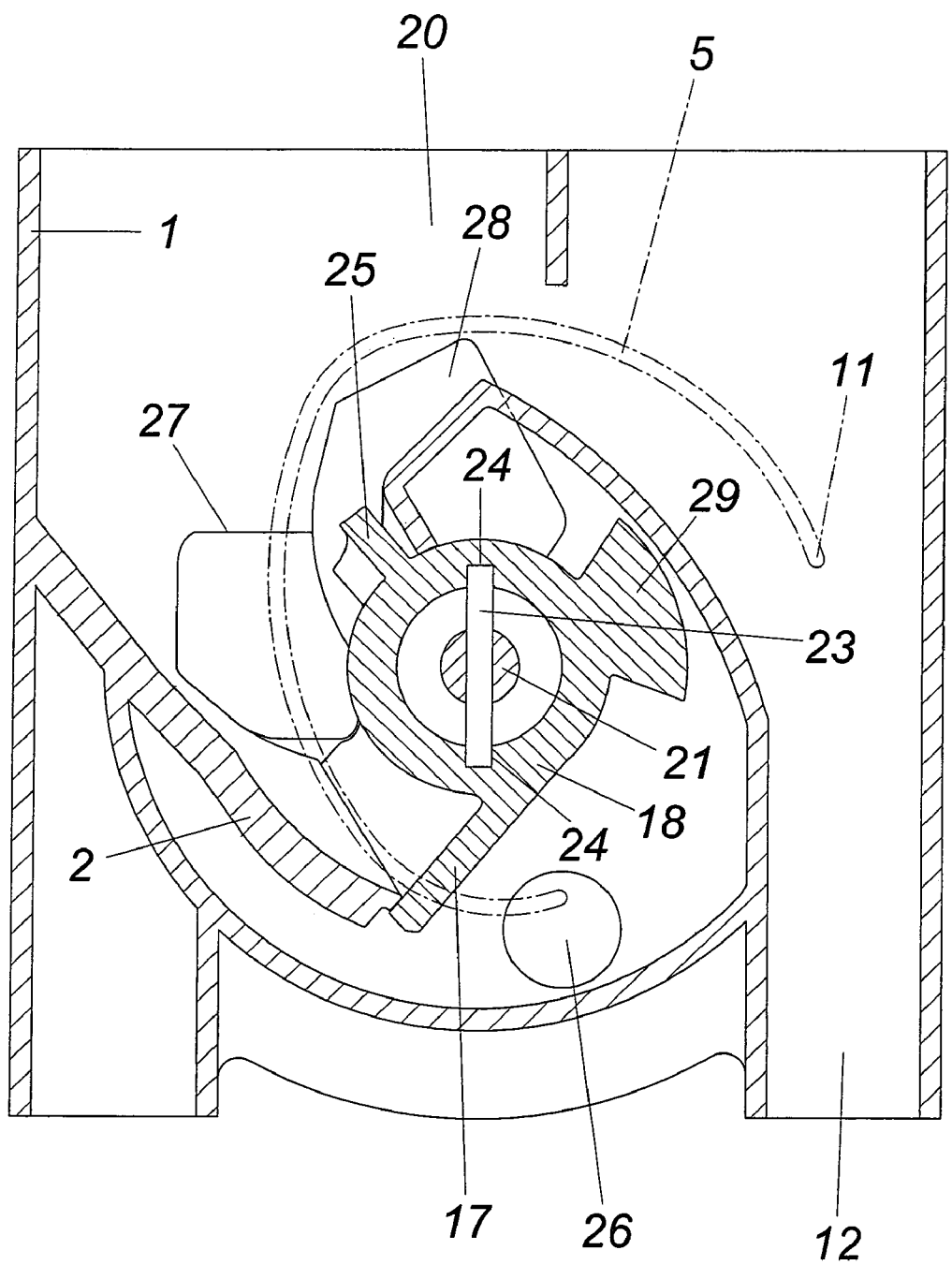
FIG. 3 shows a simplified section along line of FIG. 2 in a smaller scale.
Figure 4:
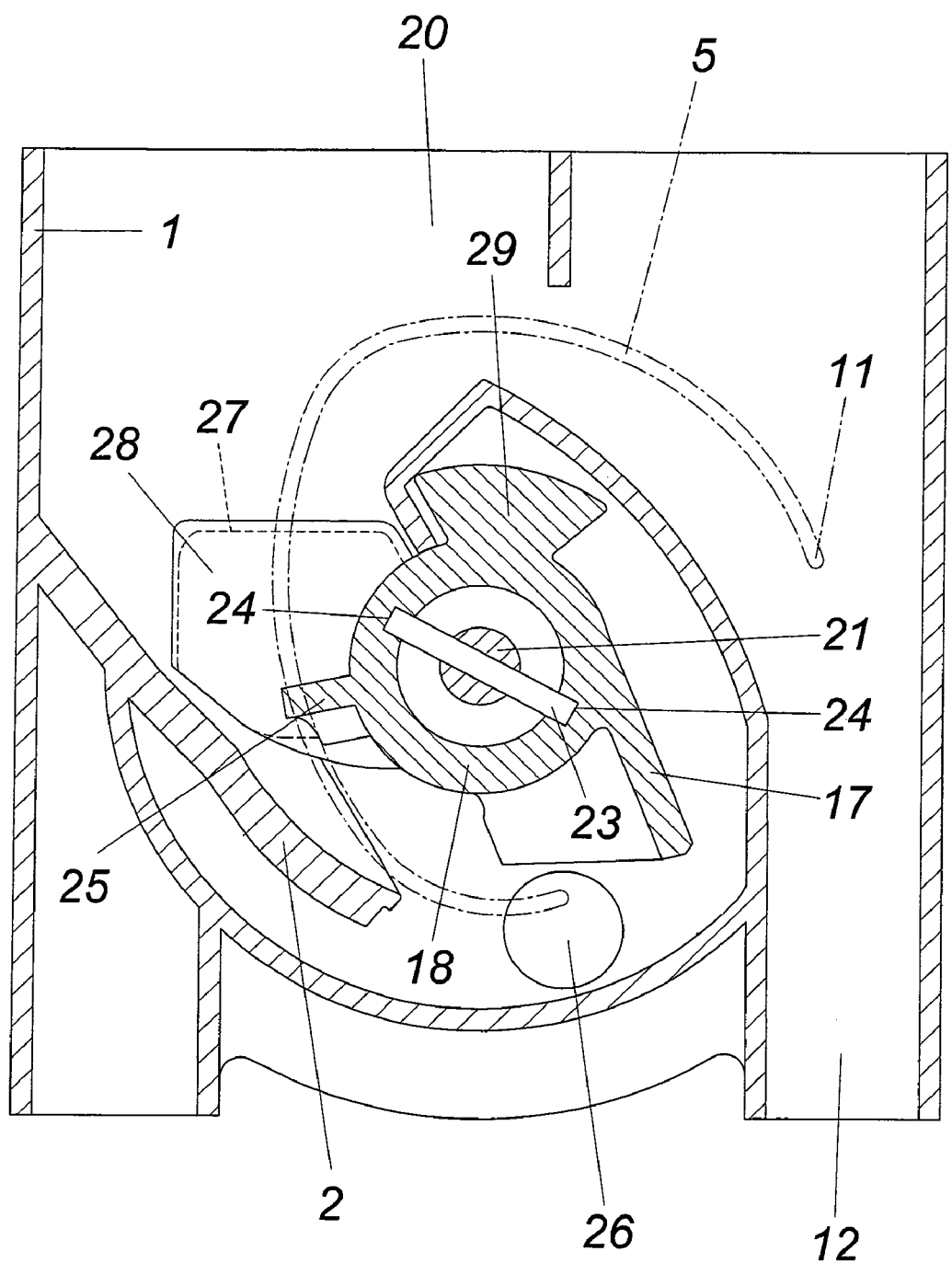
FIG. 4 shows an illustration of the single-grain sowing machine corresponding to FIG. 3, but with open emptying flap.

As can be inferred from FIGS. 3 and 4, the sleeve 18 is provided with a stripper 25, which is rotated over the area of the guide slot 5 upon the pivot displacement of the emptying flap 17 into the open position, so that seed grains suctioned on the intake openings 8 in this area are stripped off of the conveyor disc 6 and dispensed together with the remaining seeds out of the seed hopper 2. This dispensing can be performed aided by gravity via a removal shaft. In the exemplary embodiment shown, however, the remaining seed grains are suctioned out of the housing 1 via a suction line, whose discharge opening 26 is indicated in FIGS. 3 and 4.

The seed hopper 2 is filled with seed grains through a filling shaft of the housing 1, which opens into the seed hopper 2 in a typical way via a filling opening 27 in the front wall 20 of the housing 1. In order to prevent filling of the seed hopper 2 when the emptying flap 17 is open, the sleeve 18 carries a closure 28 for the filling opening 27 in the form of a closing plate protruding radially from the sleeve 18, which is pivoted in front of the filling opening 27 upon opening of the emptying flap 17.

In order to secure the closed position of the emptying flap 17 for the installation, the sleeve 18 is equipped with a counterweight 29 to the closing plate 27, which applies a closing torque, which is active in the closing direction, to the sleeve having the emptying flap 17.

The invention claimed is:

1. A single-grain sowing machine comprising:
   (a) a seed hopper having a floor comprising an emptying flap; and
   (b) a sowing disc forming a first wall of the seed hopper, said sowing disc comprising a fixed disc body having a first side facing away from the seed hopper, said fixed disc body being suctioned on said first side, said fixed disc body comprising at least one guide slot having a radial extension area and a conveyor disc having a circumference, said conveyor disc pressing against a side of the seed hopper and being drivable around a horizontal axis, said conveyor disc comprising driver slots distributed around the circumference and extending over the radial extension area, said driver slots forming intake openings for seed grains dispensable along the at least one guide slot from the seed hopper in an overlap area with the at least one guide slot;
   wherein the emptying flap is pivotable coaxially to the sowing disc between a closed position and an open position.

2. The single-grain sowing machine according to claim 1, wherein the emptying flap is connected to drive a closure for a filling opening in a second wall of the seed hopper opposite to the sowing disc, the closure exposing the filling opening in the closed position of the emptying flap, but closing the filling opening in the open position of the emptying flap.

3. The single-grain sowing machine according to claim 1, wherein the emptying flap is connected to drive a stripper for seed grains suctioned on the sowing disc.

* * * * *